United States Patent [19]

Hufnagel

[11] Patent Number: 4,750,255
[45] Date of Patent: Jun. 14, 1988

[54] MACHINE FOR DISASSEMBLING WOOD PALLETS

[76] Inventor: Paul L. Hufnagel, P.O. Box 471436, Tulsa, Okla. 74147

[21] Appl. No.: 22,663

[22] Filed: Mar. 6, 1987

Related U.S. Application Data

[63] Continuation-in-part of Ser. No. 744,767, Jun. 14, 1985, Pat. No. 4,649,617.

[51] Int. Cl.[4] ............................................. B23P 19/04
[52] U.S. Cl. .................................. 29/564.3; 29/426.4; 83/461; 83/487; 83/925 R
[58] Field of Search ...................... 83/925 R, 487, 461; 29/564.3, 426.4

[56] References Cited

U.S. PATENT DOCUMENTS

| | | | |
|---|---|---|---|
| 4,241,495 | 12/1980 | Wakeem | 29/252 X |
| 4,320,570 | 3/1982 | Williams | 29/564.3 |
| 4,346,506 | 8/1982 | Martindale | 83/925 R X |
| 4,649,617 | 3/1987 | Hufnagel | 29/426.4 |

Primary Examiner—Frank T. Yost
Attorney, Agent, or Firm—Head & Johnson

[57] ABSTRACT

An improved machine for disassembling all or a portion of wood pallets formed of paralleled stringers with deck boards nailed to the top and bottom edges of the stringers, the machine having a horizontal support arm onto which a stringer of a wood pallet is positioned, the deck boards of the pallet extending to either side of the support arm, a cylinder-piston supported above the support arm and having a piston rod extending therefrom for engaging a stringer positioned on the support arm and to clamp the stringer in position on the support arm, a carrier arm supported parallel to and spaced from the support arm, a hub slidable on the carrier arm, opposed cutter wheels rotatably supported to the hub, the periphery of the cover wheels being adjacent the opposed sides of the support arm, an a reciprocable cylinder-piston for moving the hub and therefore the cutter wheels to cut the nails holding the pallet deck boards to the stringer positioned on the support arm. The width of the support arm is controllably variable to permit adjustment for different width stringers.

9 Claims, 5 Drawing Sheets

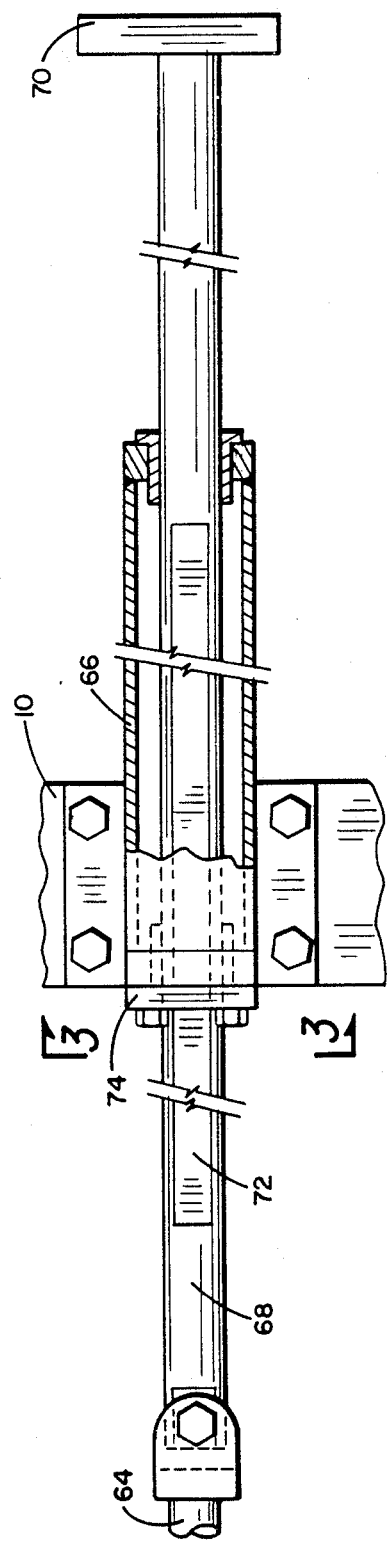
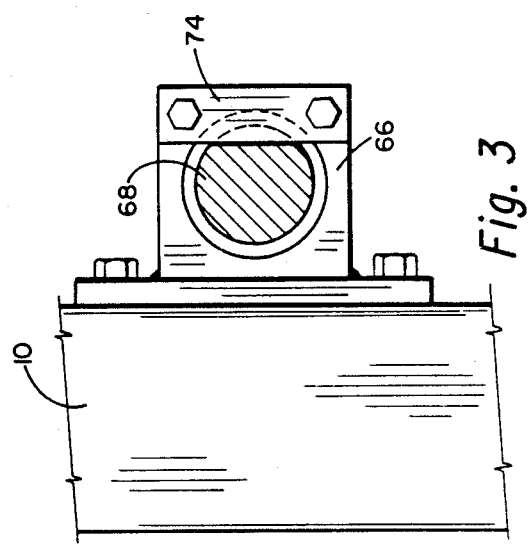
Fig. 2
Fig. 3

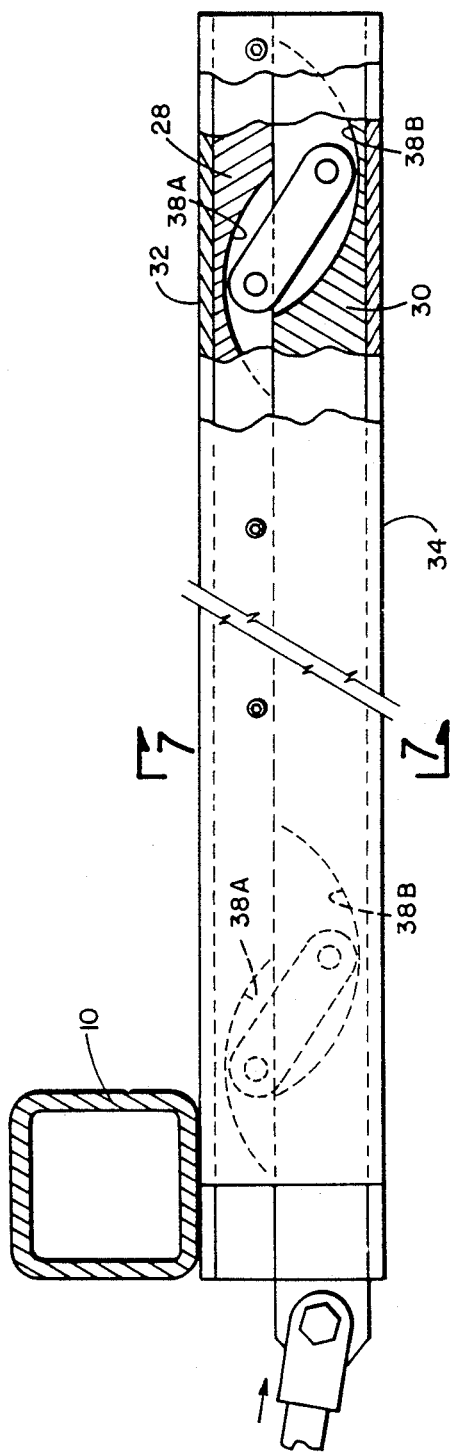
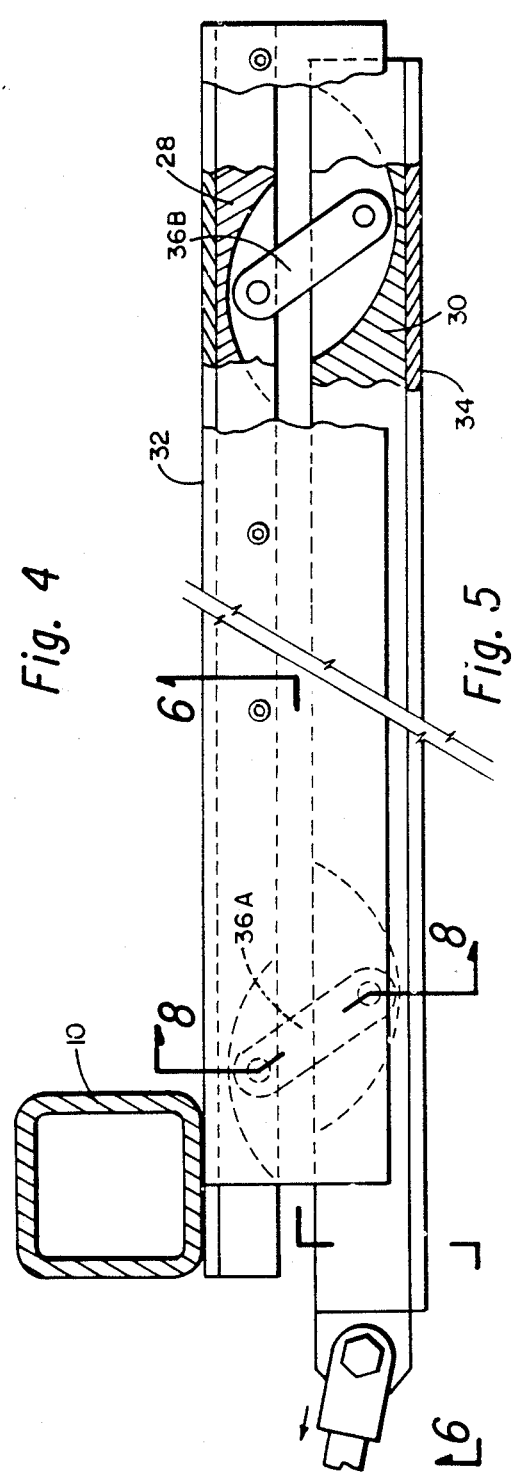

MACHINE FOR DISASSEMBLING WOOD PALLETS

CROSS REFERENCE

This is a continuation-in-part of application Ser. No. 744,767, filed June 14, 1985, now U.S. Pat. No. 4,649,617, entitled: "Machine for Partially or Completely Disassemblying Wood Pallets".

SUMMARY OF THE INVENTION

Wood pallets are commonly employed in industry and in shipping and wholesale businesses for storing and moving products. Wood pallets provide a base on which products can be positioned and by use of a fork lift the pallets with materials stored thereon can be speedily moved from one location to another. The pallets further provide means of keeping the products from contact with the floor of the structure in which they are stored. Because of the widespread usage of pallets the business of manufacturing and supplying pallets has become a major industry in the United States and other industrialized nations of the world.

While wood pallets have a rather long length of service they nevertheless are subject to damage and it is necessary to periodically disassemble them so that the materials of which they are made can be employed for making new pallets. A wood pallet typically is formed of three stringers which may be such as 2×4's. The stringers are placed parallel to each other. On one surface of the stringers deck boards are nailed. The deck boards are typically one inch lumber, such as 1×4's, 1×6's, 1×8's, etc. The deck boards are typically nailed to the stringers with small gaps between them so as to provide, when the pallet is assembled, a generally flat, horizontal surface. Deck boards are nailed both to the bottom and top edges of the stringers so that the deck boards on one side function to provide a bottom support surface and the deck boards on the other side of the stringers provide a top, material receiving, surface. Deck boards can become damaged by excess weight or, if the deck boards are formed of material having knots or imperfections therein, weak areas occur in the deck boards and they can become defective so as not to provide a good material receiving surface. Stringers also can become defective so that they are not sufficiently strong to support the deck boards and carry the weight of the material stacked on the pallet.

For these reasons it is frequently necessary to scrap a pallet. In doing so, the pallet is disassembled so that reuseable stringers and deck boards can be employed in building new pallets.

The present invention is directed towards an improved machine for disassemblying wooden pallets. The machine includes an elongated support arm onto which a wood pallet is positioned with a stringer in engagement with the support arm and the deck boards extending to either side of it. The machine is used to disassemble pallets while they are supported in a vertical position.

A means is provided to clamp a stringer in fixed position on the support arm. At the outer end of the support arm there is an upstanding stop member. A cylinder-piston member is supported above and adjacent the support arm inner end. The cylinder-piston member has a piston rod extending reciprocably therefrom in the vertical plane of and above the support arm. The outer end of the piston rod has a stringer engaging member. When a pallet is positioned on the machine with a stringer resting on the support arm, the piston rod can be extended by the cylinder-piston member to clamp the stringer against the top member.

Since the width of stringers may vary, an important feature of the invention is the provision of improved means whereby the width of the support arm may be varied so that when a pallet is placed in engagement with the support arm the width of the arm is adjusted to correspond to the width of the stringer contacting the support arm.

This is accomplished by employment of first and second elongated portions each having an outer board engaging edge, the board engaging edges being parallel to each other. First and second spaced apart paralleled yoke members are each pivoted at one end to the first elongated portion and at the other end to the second elongated portion in a parallelogram configuration. By use of a hydraulically controlle cylinder-piston the second elongated portion can be shifted relative to the first elongated portion to vary the width between the board engaging edges.

An elongated carrier arm is supported parallel to and spaced above the support arm. A hub is slideably supported by the carrier arm and is reciprocably moved by a cylinder-piston, the piston rod being affixed to the hub. Opposed cutter wheels are rotatably supported to the hub. The periphery of the cutter wheels are adjacent the opposed sides of the support arm. As the support arm width is varied the spacing between the cutter wheels is likewise varied.

With a pallet positioned on the support arm and clamped into position the lateral movement of the hub and cutter wheel serve to cut the nails holding the deck boards to the stringers. This operation is repeated for each stringer and thereby the deck boards are separated from the stringers enabling both the stringers and the deck boards to be reused. The operation is carried out very expeditiously and controlled by an operator so that other than the placement of the pallet in proper position on the support arm, all other operations of disassemblying the pallet are carried out automatically.

Others have provided machines for disassemblying wood pallets and for background information reference may be had to the following U.S. Pat. Nos.: 4,435,892; 4,241,495; 225,252; 2,652,864; 4,372,174; 4,346,506; 4,152,819; 1,645,924; 3,718,063; 4,467,849; 4,320,570; 3,869,780; 2,593,843; 4,104,944 and 4,418,260.

A better understanding of the invention will be had with reference to the following description and claims taken in conjunction with the attached drawings.

DESCRIPTION OF THE DRAWINGS

FIG. 2 is an elevational view, shown partially broken away, of a portion of the support post and the piston rod portion of the mechanism for clamping the stringer of a pallet to the machine support arm.

FIG. 3 is a cross-sectional view taken along the line 3—3 of FIG. 2.

FIG. 4 is a top view, shown partially broken away, of the support arm of this invention showing the mechanism by which the width of the support arm is varied.

FIG. 4 shows the support arm in the retracted or narrowest width position.

FIG. 5 is a view as in FIG. 4 but showing the support arm moved to a wider position.

DETAILED DESCRIPTION OF THE PREFERRED EMBODIMENT

Figure 1:
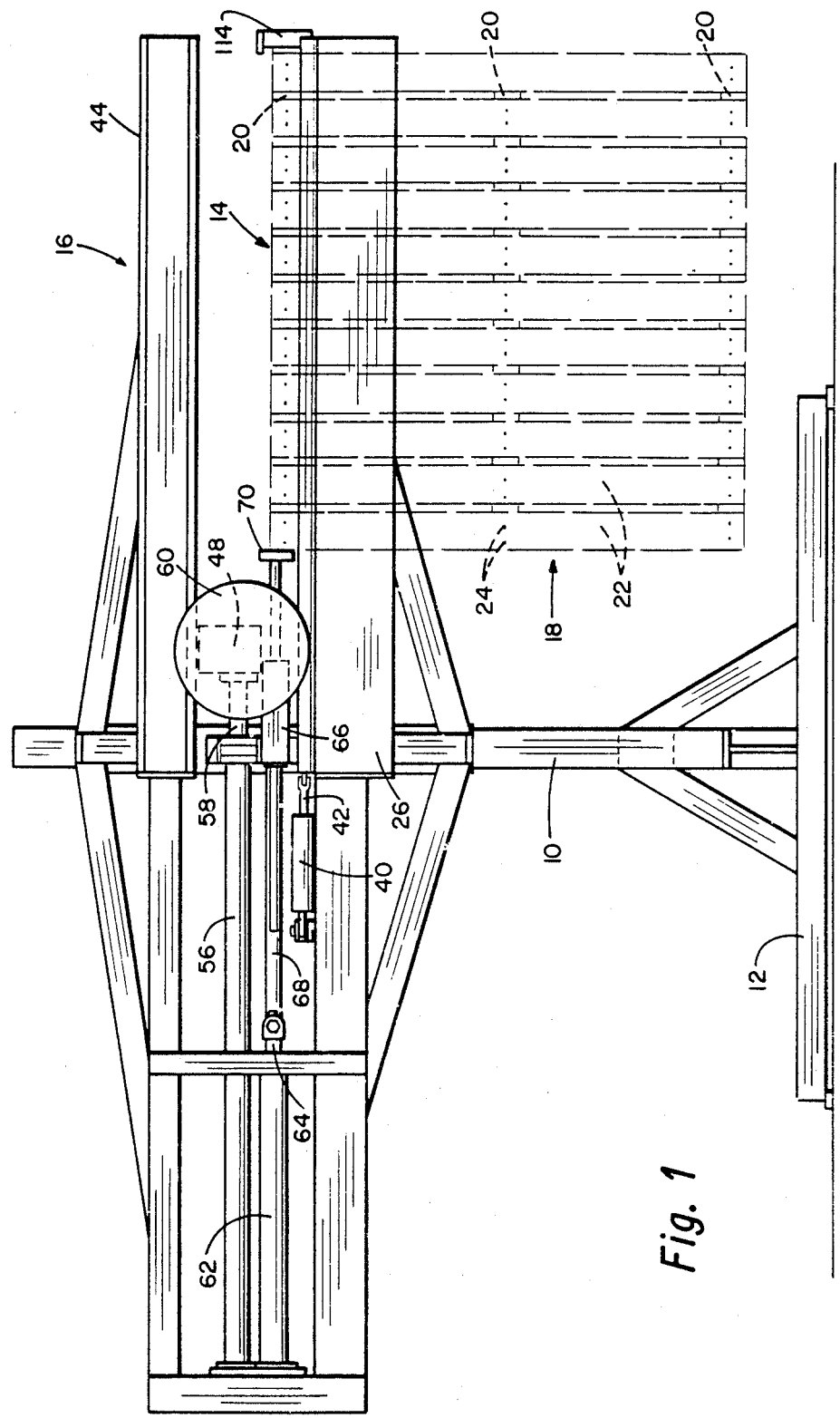
FIG. 1 is an elevational view of an improved machine for disassemblying wood pallets according to the invention showing a wood pallet in dotted outline positioned on the machine.
Figure 8:
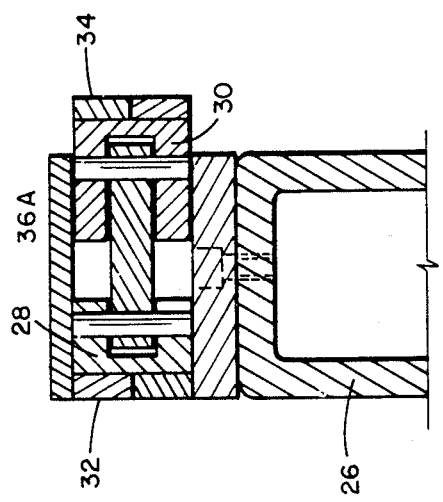
FIG. 8 is another cross-sectional view of the support arm as taken along the line 8—8 of FIG. 5.
Figure 7:
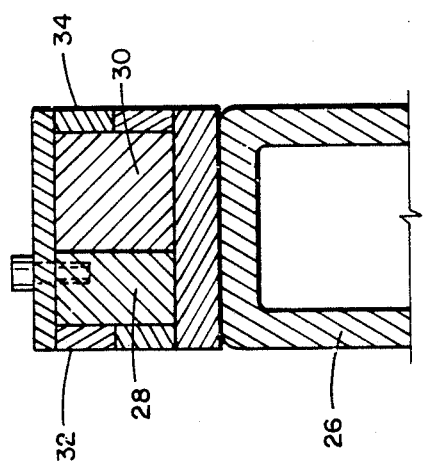
FIG. 7 is a cross-sectional view of the support arm taken along the line 7—7 of FIG. 4.
Figure 6:
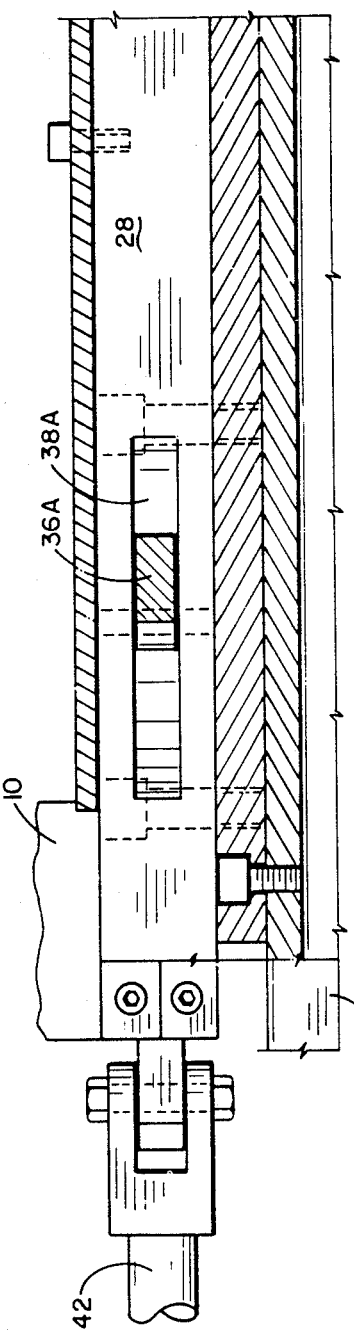
FIG. 6 is a partial cross-sectional view taken along the line 6—6 of FIG. 5 showing some of the details of the variable width support arm.

Referring to the drawings and first to FIG. 1, a machine employing the principles of this invention is illustrated. The machine includes a post member 10 supported on a base 12, the post member being vertical. Extending from the post member is a horizontal elongated support arm generally indicated by the numeral 14 and positioned above the support arm and extending horizontally is a carrier arm 16. Post 10, support arm 14 and carrier arm 16 are in a vertical plane.

The function of the support arm 14 is to receive a wooden pallet thereon, a wooden pallet being indicated in dotted outline in FIG. 1 and generally indicated by numeral 18. The wooden pallet includes stringers 20, usually formed of 2×4's and a typical wooden pallet employs three stringers 20. Affixed to the top and bottom edges of the stringers 20 are deck boards 22. The deck boards are secured to the stringers by means of nails 24. The function of the pallet disassembly machine is to cut the nails 24 so that the deck boards are severed from the stringers permitting both to be reused in fabricating new pallets.

The support arm 14 includes a lower structural member 26 having a width less than the width of the smallest stringer of a pallet to which the machine is designed and the support arm further includes a portion supported by structure 26 which is of variable width. Variable width is achieved by a first elongated portion 28 and a second elongated portion 30 (See FIGS. 4 and 5). The first support arm portion 28 has an outer edge 32 and, in like manner the second portion of the support arm portion 30 has an outer edge 34. The outer edges 32 and 34 define the width of the support arm and in the use of the machine the support arm is adjusted in width so that the outer edges 32 and 34 engage, or substantially engage, the inner sides of the top and bottom deck boards on a pallet.

As shown in FIGS. 4 and 5, the width of the support arm 14 is variable by the longitudinal positioning of the second portion 30 relative to the first portion 28.

Extending between the first portion 28 and second portion 30 is a first yoke member 36A and a second yoke member 36B. Each of the yoke members is pivoted at one end to the arm first portion 28 and at the other end to the second arm portion 30, in a parallelogram arrangement. The yoke members 36A and 36B are received in recesses 38A formed in the first portion 28 and recesses 38B formed in second portion 30.

A cylinder 40 which has a piston rod 42 extending from it is used to change the width of the support arm. By means of hydraulic pressure the longitudinal position of the support arm second portion 30 can be varied by extending or retracting the piston rod 42 so that the operator can adjust the width of the support arm to conform to the width of the stringer of the wooden pallet positioned on the support arm.

Figure 10:
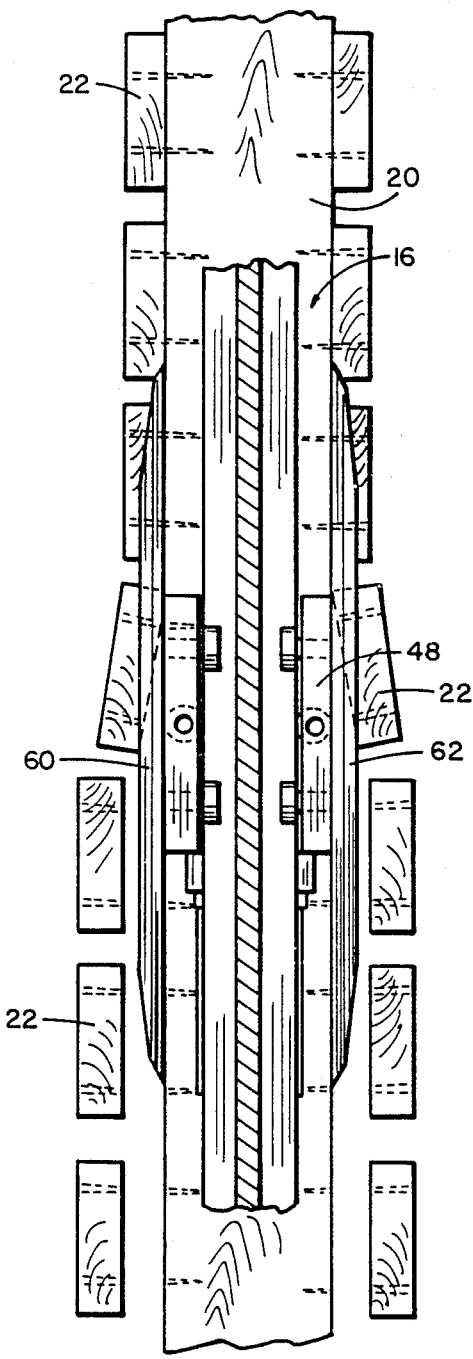
FIGS. 9 and 10 show the cross-sectional configuration of the carrier arm.
Figure 9:
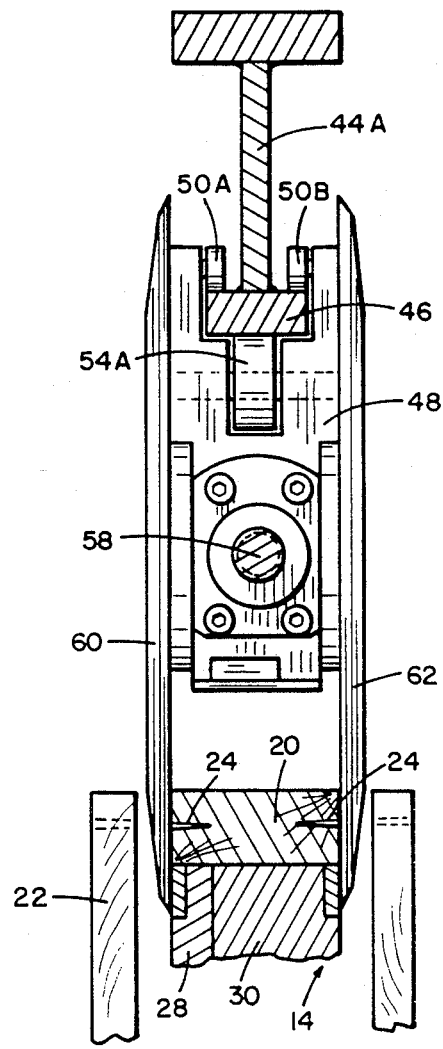

The cross-sectional configuration of a carrier arm 16 is shown in FIG. 9 and 10. The carrier arm includes a T-shaped structural member 44 having a vertically extending web portion 44A. Affixed to the lower horizontal edge of the web portion 44A is a race member 46 of square cross-sectional configuration providing upper, lower and first and second side smooth rolling surfaces.

A hub 48 is supported by the race member 46. The hub 48 has upper rollers 50A and 50B, side rollers 52A and 52B and bottom rollers 54A and 54B (See FIG. 9). By means of a cylinder 56 (See FIG. 1) having a piston rod 58 reciprocably extending therefrom, the hub 48 is reciprocated along the length of the carrier arm 16.

The function of hub 48 is to carry cutter wheels 60 and 62. In order to accommodate pallets having varying width stringers the spacing between cutter wheels 60 and 62 must be variable. A method whereby the width between cutter wheels 60 and 62 is variable is described in detail in the parent application and is incorporated herein by reference.

FIGS. 9 and 10 show the machine as used to cut the nails 24 holding deck boards 22 to a stringer 20. The stringer is positioned on the top of the variable width portions 28 and 30 of the support arm 14. FIG. 9 shows a support arm in its retracted position so that the stringer 20 is of the narrowest width to which the machine is designed. The first and second support arm portions 28 and 30 are shown provided with cutting strips 110 and 112 which are made of very hard materials. FIG. 10 shows a top cross-sectional view as the cutters move along on the carrier arm 16, severing the nails holding the deck boards to stringer 20.

As seen in FIG. 1, attached to the outer end of the support arm 14 is a stop member 114. In loading the pallet 18 onto the machine it is slid over the stop member and rests on support arm 14.

When a pallet 18 is placed on the machine it is slid over the top of stop member 116 affixed to the outer end of the support arm 14. A cylinder-piston 62 has a piston rod 64 extending from it. The cylinder-piston 62 and piston rod 64 are supported above the support arm 14 and below arm 16 and also below the piston cylinder 56 which actuates the cutter wheels.

A pillow block 66 is secured to post 10 and reciprocably receives a shaft 68. Affixed to the outer end of shaft 68 is a block 70. Block 70 engages one end of a stringer 20 positioned on the support arm as shown in FIG. 1.

Shaft 68 has a flat surface 72 thereon which is engaged by a bar 74 so as to retain the shaft 68 in a reciprocal but non-rotatable position.

To operate the machine to cut the nails 24 which holds boards 20 onto a stringer 20 the pallet is positioned on the support arm 14 with a stringer 20 resting on top of the support arm. The shafts 58 and 68 are both withdrawn into a rearward position. The operator can then, by remote control means (not shown) actuate the cylinder-piston 62 to move shaft 68 forward, pushing block 80 against the stringer 20 resting on the support arm and clamping the stringer between block 70 and stop member 114. The operator then actuates the cylinder 70 to adjust the width of the support arms as has been described with reference to FIGS. 4 and 5. The operator then actuates the piston cylinder 56, advancing shaft 58 to move the cutter wheels 60 and 62 along each side of the support arm. As the shaft 58 advances the cutter wheels assume a width between each other equal to the spacing between the cutting edges of the support arm. As shaft 58 is advanced each of the nails 28 holding boards to the stringer 20 are severed.

After shaft 58 has been fully advanced, severing all of the nails, it is retracted, by actuation of cylinder 40. The width of the support arm is withdrawn to the narrowest width. This permits the stringer 20 to be removed and the pallet repositioned so that a new stringer is placed onto the support arm. In this way the pallet can be positioned so that each of the stringers is supported on the support arm and the nails severed to completely remove the boards from the stringers and thus, completely disassemblying the machine.

It can be seen that the pallet disassembly machine of this invention has improvements in two basic way over that disclosed in the parent application. The first is the improved means of clamping a stringer in position on the support arm as best illustrated in FIGS. 2 and 3 and the second basic improvement is the improved means of varying the width of the support arm as best illustrated in FIGS. 4 through 8.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A machine for completely or partially disassembling wood pallets of the type made of paralleled, spaced apart stringers onto which deck board are retained by nails, the deck boards extending perpendicular to the strings and being nailed to both sides of the stringers, the assembled pallets providing a bottom support surface of deck boards and a top material receiving surface of deck boards, the machine comprising:
   an elongated support arm having an inner end and an outer end onto which a wood pallet is positioned with a stringer in engagement with the support arm and deck boards extending to either side;
   an elongated carrier arm supported parallel to and spaced from the support arm;
   a hub slideably supported by said carrier arm;
   opposed cutter wheels rotatably supported to said hub, the periphery of the cutter wheels being adjacent the opposed sides of said support arm;
   a stop member at said outer end of said support arm;
   a controllable pallet restrainer means adjacent the inner end of said support arm to controllably engage a stringer positioned on said arm and to clamp the stringer against said stop member; and
   means to reciprocably extend said hub and cutter wheels to cut the nails between deck boards and a stringer positioned on said support arm.

2. A pallet disassembly machine according to claim 1 wherein said controllable pallet restrainer means is in the form of a cylinder-piston means having a piston rod extending reciprocably therefrom, the piston rod having means to engage a stringer positioned on said arm.

3. A pallet disassembling machine according to claim 1 wherein said support arm is variable in width.

4. A pallet disassembling machine according to claim 1 wherein said support arm is variable in width and wherein the spacing between said cutter wheels is variable.

5. A pallet disassembling machine according to claim 1 wherein said means to reciprocably extend said hub and cutter wheels includes a hydraulically actuated cylinder-piston.

6. A pallet disassembling machine according to claim 1 wherein said support arm comprises:
   a first elongated portion having an outer board engaging edge;
   a second elongated portion having an outer board engaging edge, the said engaging edges being opposite and parallel each other;
   first and second spaced apart, paralleled yoke members each pivoted at one end to said first elongated portion and at the other end to said second elongated portion in a parallelogram configuration; and
   means to selectively vary the lateral displacement of said support arm second portion relative to said support arm first portion.

7. A pallet disassembly machine according to claim 6 wherein said means to vary the lateral displacement of said support arm second portion relative to said first portion includes a hydraulically controllable cylinder piston.

8. A pallet disassembly machine according to claim 2 including:
   a vertical post member, said support arm being affixed at one end thereof to said post member and extending horizontally therefrom, and said carrier arm being affixed at one end thereof to said post member and extending horizontally thereto above said support arm, said controllable pallet retainer cylinder-piston means being supported to said post and extending horizontally thereto above said support arm and below said carrier arm, said post member, support arm, carrier arm and controllable pallet retainer cylinder-piston means being in a common vertical plane.

9. A machine for completely or partially disassembling wood pallets of the type made of paralleled, spaced apart stringers onto which deck board are retained by nails, the deck boards extending perpendicularly of the strings and being nailed to both sides of the stringers, the assembled pallets providing a bottom support surface of deck boards and a top material receiving surface of deck boards, the machine comprising:
   an elongated support arm onto which a wood pallet is positioned with a stringer in engagement with the support arm and deck boards extending to either side,
   an elongated carrier arm supported parallel to and spaced from the support arm;
   said support arm having a first elongated portion having an outer board engaging edge and a second elongated portion having an outer board engaging edge;
   said engaging edges being opposite and parallel to each other, and having first and second spaced apart, paralleled yoke members each pivoted at one end to said first elongated portion and at the other end to said second elongated portion in a parallelogram configuration whereby as said second portion is laterally displaced relative to said first portion the width between said board engaging edges change;

means to selectively vary the lateral displacement of said support arm second portion relative to said support arm first portion;

a hub slideably supported by said carrier arm;

opposed cutter wheels rotatably supported to said hub, the periphery of the cutter wheels being adjacent the opposed board engaging edges of said support arm;

means on said support arm to restrain a pallet stringer thereon from laterally shifting; and means to reciprocably extend said hub and cutter wheels to cut the nails between deck boards and a stringer positioned on said support arm.

* * * * *